UNITED STATES PATENT OFFICE.

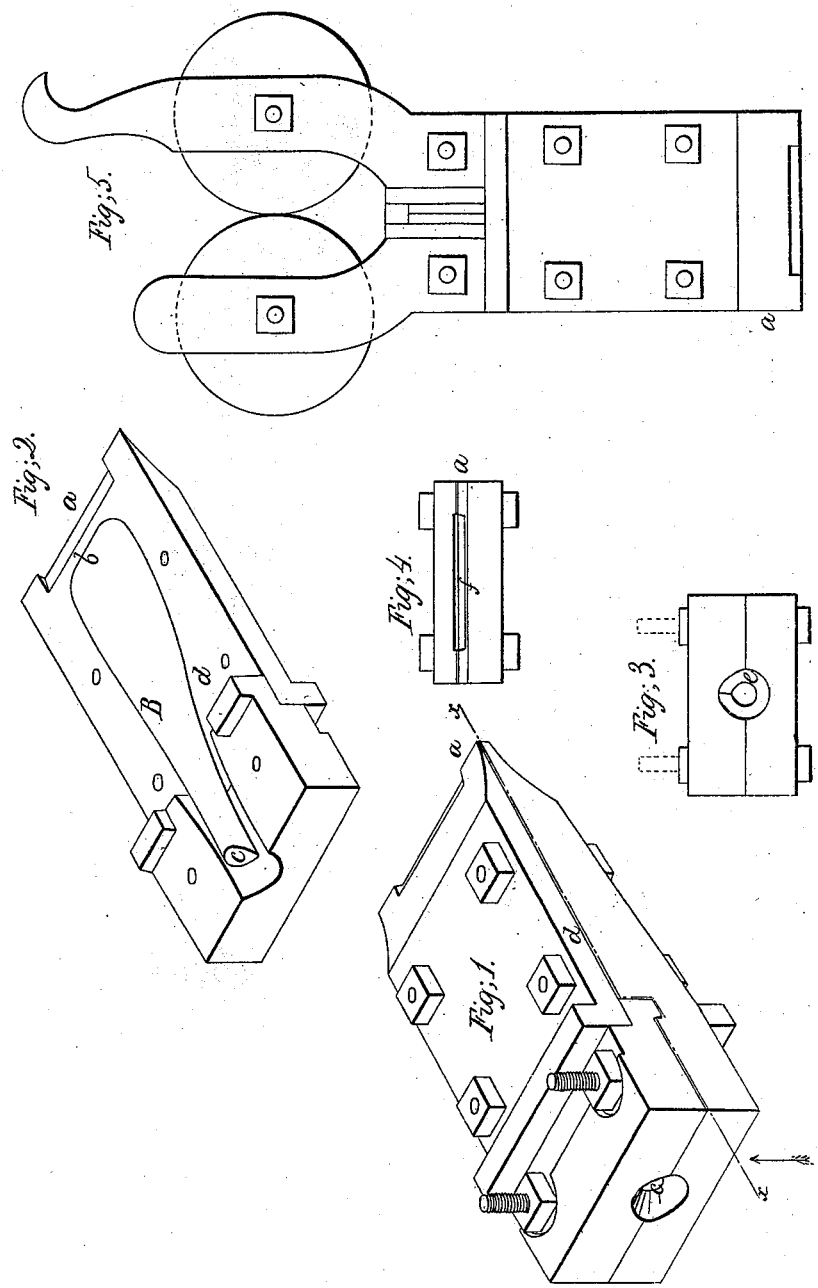

JAMES McCARTY, OF READING, PENNSYLVANIA.

METHOD OF BENDING SKELP FROM WHICH IRON TUBES ARE MADE.

Specification of Letters Patent No. 6,003, dated January 9, 1849.

*To all whom it may concern:*

Be it known that I, JAMES McCARTY, of Reading, in the county of Burks and State of Pennsylvania, have invented certain new and useful Improvements in Making Wrought Iron Tubes, and that the following is a full, clear, and exact description of the principle or character which distinguishes them from all other things before known and of the usual manner of making, modifying, and using the same, reference being had to the accompanying drawing, which forms a part thereof, in which—

Figure 1 is an isometrical projection. Fig. 2, is a section on line $x$ $x$ Fig. 1. Fig. 3, is the end of the former where the skelp is delivered. Fig. 4, is the opposite end. Fig. 5 is a modified former.

The nature of my invention consists in combing with the finishing rollers a mold or former for receiving the shelp from said rollers; and by means of the form of said mold or former gradually bending the shelp into a suitable form for welding into tubes.

The rollers and fixtures are of the ordinary description, and are not shown in the drawings, as they are well known to all practical iron masters; directly in front of these rollers I place a metal mold, formed in two parts, or otherwise, as is most convenient to construct it, the narrow end ($a$) fitting in between the rollers so as to receive the skelp directly therefrom; this opening, when the skelp first enters, is flat and oblong, but it gradually curves up so as to bend the skelp into the form required for welding into tubes which thus perfects (the operation) (without reheating,) and the consequent expense and injury to the iron, incident to the processes heretofore employed. The two parts of the mold are properly secured by bolts or otherwise and the whole may be affixed in position by bars and braces, according to the position of the rollers and construction of their frame.

The upper half ($d$) of the mold, shown in Fig. 2, is made straight, is chamfered off on its inner surface at the point ($a$) for the purpose of more readily receiving the skelp, as it issues from between the rollers, from the point ($b$) a projection gradually rises, the base of which at ($b$) is nearly the whole width of the skelp; this projection gradually diminishes in breadth as it projects from the surface of the plate ($d$) becoming more and more cylindrical in form, till at its opposite end ($c$) it is entirely detached therefrom, and forms a mandril, around which the skelp is gradually bent into proper shape by the other portions of the mold, which surround it for that purpose, having a space sufficient for the skelp to pass. The form in which the skelp issues from the mold is shown at ($e$) Fig. 3; and ($f$) Fig. 4 is its form on entering the mold.

A modification of the above described improvement, which I have essayed to describe, is shown in Fig. 5, in which I form the mold so as only to bend the skelp into a semicircle in its cross section when it leaves the mold, and then causing it to enter between two grooved rollers, which closes it up into the form required for welding, as in the first named process is done without them.

Having thus fully described my improvement, what I claim therein as new, and for which I desire to secure Letters Patent, is—

The mold constructed and arranged substantially as described, in combination with the finishing rollers of a common rolling mill.

JAMES McCARTY.

Witnesses:
J. J. GREENOUGH,
WM. GREENOUGH.